US005608845A

United States Patent [19]

Ohtsuka et al.

[11] Patent Number: 5,608,845

[45] Date of Patent: Mar. 4, 1997

[54] METHOD FOR DIAGNOSING A REMAINING LIFETIME, APPARATUS FOR DIAGNOSING A REMAINING LIFETIME, METHOD FOR DISPLAYING REMAINING LIFETIME DATA, DISPLAY APPARATUS AND EXPERT SYSTEM

[75] Inventors: Hisao Ohtsuka; Motoaki Utamura, both of Hitachi, Japan

[73] Assignee: Hitachi, Ltd., Tokyo, Japan

[21] Appl. No.: 158,439

[22] Filed: Nov. 29, 1993

Related U.S. Application Data

[62] Division of Ser. No. 494,629, Mar. 16, 1990, abandoned.

[30] Foreign Application Priority Data

Mar. 17, 1989 [JP] Japan .................................... 1-063852

[51] Int. Cl.[6] .................................................... G06F 15/18

[52] U.S. Cl. ........................................ 395/50; 364/551.01

[58] Field of Search .............................. 364/551.01, 184, 364/185, 186, 187, 550; 395/50, 183.02, 911, 912, 913, 914, 915, 916, 917, 918

[56] References Cited

U.S. PATENT DOCUMENTS

| | | | |
|---|---|---|---|
| 4,517,468 | 5/1985 | Kemper et al. | 290/52 |
| 4,644,479 | 2/1987 | Kemper et al. | 364/550 |
| 4,649,515 | 3/1987 | Thompson et al. | 364/900 |
| 4,875,170 | 10/1989 | Sakurai et al. | 364/507 |
| 4,908,775 | 3/1990 | Palusamy et al. | 364/508 |
| 4,947,341 | 8/1990 | Shine | 364/508 |
| 5,009,833 | 4/1991 | Takeuchi et al. | 395/914 |
| 5,027,268 | 6/1991 | Sakurai et al. | 364/551.01 |
| 5,033,010 | 7/1991 | Lawrence et al. | 364/550 |
| 5,067,099 | 11/1991 | McCown et al. | 364/550 |
| 5,132,920 | 7/1992 | Bellows et al. | 364/551.01 |
| 5,253,184 | 10/1993 | Kleinschnitz | 364/550 |

FOREIGN PATENT DOCUMENTS

| | | |
|---|---|---|
| 146359B3 | 2/1981 | German Dem. Rep. . |
| 252658A1 | 12/1987 | German Dem. Rep. . |

OTHER PUBLICATIONS

Y. Kobayashi et al., "Development of Planning Expert System for Preventive Maintenance of Plant Components," Int'l. Conf. on the Application of Artificial Intelligence, pp. 461–468. Dec. 1989.

S. Arueti and D. Okren, "A Knowledge–Based Prototype for Optimization of Preventive Maintenance Scheduling," *Reliability Engineering & System Safety,* 1–3 (1990), pp. 93–114.

Terano et al., "Dam Gate Diagnosing Advisor—an Expert System for Steel Structures," Int'l. Workshop on Artificial Intelligence for Industrial Applications, May 1988, 129–134.

Eaves–Walton et al., "Intelligent Online Process Monitoring and Fault Isolation," IEE Colloq. on Condition Monitoring and Fault Diag., Nov. 1988, 6/1–6/4.

Sedding et al., "Development of Novel Instrumentation and Expert System Concepts in Turbine Generator Condition Monitoring," IEE Conf. on Electrical Machines and Drives, Sep. 1989, 177–181.

*Primary Examiner*—Robert W. Downs

*Attorney, Agent, or Firm*—Antonelli, Terry, Stout & Kraus, LLP

[57] ABSTRACT

In a method for determining a remaining lifetime of an aggregate constructed of a plurality of components and having at least one function, and an apparatus thereof, a first remaining lifetime of the aggregate is acquired based upon experimental aging degradation data on one characteristic of at least one component of the aggregate; a second remaining lifetime of the aggregate is acquired based upon experimental aging data with respect to at least one function of the aggregate; a third remaining lifetime of the aggregate is acquired based on both the experimental aging degradation data on the one characteristic of at least one component of the aggregate and the experimental aging data on at least one function of the aggregate; and, a remaining lifetime having the shortest lifetime from the first through third remaining lifetimes is output as the remaining lifetime of the aggregate.

11 Claims, 14 Drawing Sheets

FIG. 16

CRD REMAINING LIFETIME DATA

| | 02 | 06 | 10 | 14 | 18 | 22 | 26 | 30 | 34 | 38 | 42 | 46 | 50 |
|---|---|---|---|---|---|---|---|---|---|---|---|---|---|
| 51 | | | | | 9.4 | 6.4 | 4.4 | 5.4 | 7.4 | | | | |
| 47 | | | 7.4 | 6.4 | 14.4 | 4.4 | 12.4 | 7.4 | 8.4 | 6.4 | 15.4 | | |
| 43 | | 12.1 | 8.4 | 9.2 | 4.4 | 5.4 | 18.4 | 2.4 | 2.4 | 2.4 | 3.4 | 10.6 | |
| 39 | | 3.3 | 4.5 | 8.4 | 4.4 | 10.4 | 3.4 | 2.4 | 2.4 | 10.5 | 4.4 | 12.2 | |
| 35 | 7.3 | 12.8 | 12.9 | 7.6 | 4.8 | 4.4 | 12.4 | 2.4 | 0.8 | 12.9 | 5.4 | 2.4 | 4.4 |
| 31 | 10.4 | 10.3 | 7.4 | 8.3 | 6.6 | 5.4 | 0.4 | 12.4 | 12.4 | 2.4 | 3.4 | 2.4 | 6.6 |
| 27 | 6.5 | 12.2 | 12.4 | 5.4 | 4.4 | 0.5 | 2.4 | 0.9 | 1.2 | 3.4 | 5.4 | 2.4 | 12.4 |
| 23 | 8.6 | 2.0 | 12.6 | 12.9 | 2.8 | 12.9 | 0.7 | 2.4 | 2.6 | 12.2 | 6.4 | 12.4 | 5.7 |
| 19 | 12.7 | 2.6 | 10.5 | 10.4 | 12.7 | 12.9 | 2.4 | 12.5 | 2.7 | 12.8 | 12.4 | 7.4 | 9.4 |
| 15 | | 6.8 | 7.4 | 18.4 | 17.0 | 6.5 | 17.1 | 0.2 | 12.4 | 8.4 | 5.4 | 12.4 | |
| 11 | | 12.4 | 8.4 | 6.4 | 6.4 | 7.4 | 6.4 | 5.4 | 10.4 | 5.4 | 6.4 | 7.4 | |
| 07 | | | 6.4 | 7.4 | 7.4 | 10.4 | 14.4 | 6.4 | 14.4 | 8.4 | 12.4 | | |
| 03 | | | | | 6.4 | 6.4 | 8.4 | 14.4 | 6.4 | | | | |

[ TITLE OF PLANT ] XXX

[ DATE OF MEASUREMENT ] '89.09.25

[ MEASUREMENT NUMBER ] 000

| | | |
|---|---|---|
| PRESSURE DIFFERENCE IN DRIVE WATER | 25 | kg/cm2 |
| FLOW RATE OF DRIVE WATER | 0 | ℓ/min |
| PRESSURE DIFFERENCE IN COOLANT | 3.0 | kg/cm2 |
| FLOW RATE OF COOLANT | 172 | ℓ/min |
| REACTOR PRESSURE | 64.7 | kg/cm2 |
| TEMPERATURE REACTOR WATER | 270 | °C |
| GENERATOR OUTPUT | 142 | MV/C |

REMAINING LIFETIME (YEAR)

COLOR ALLOCATION OF REMAINING LIFETIME

0 ~ 0.5
0.6 ~ 1.0
1.1 ~ 2.0
2.1 ~ 5.0
5.1 ~ (YEAR)

FIG. 18

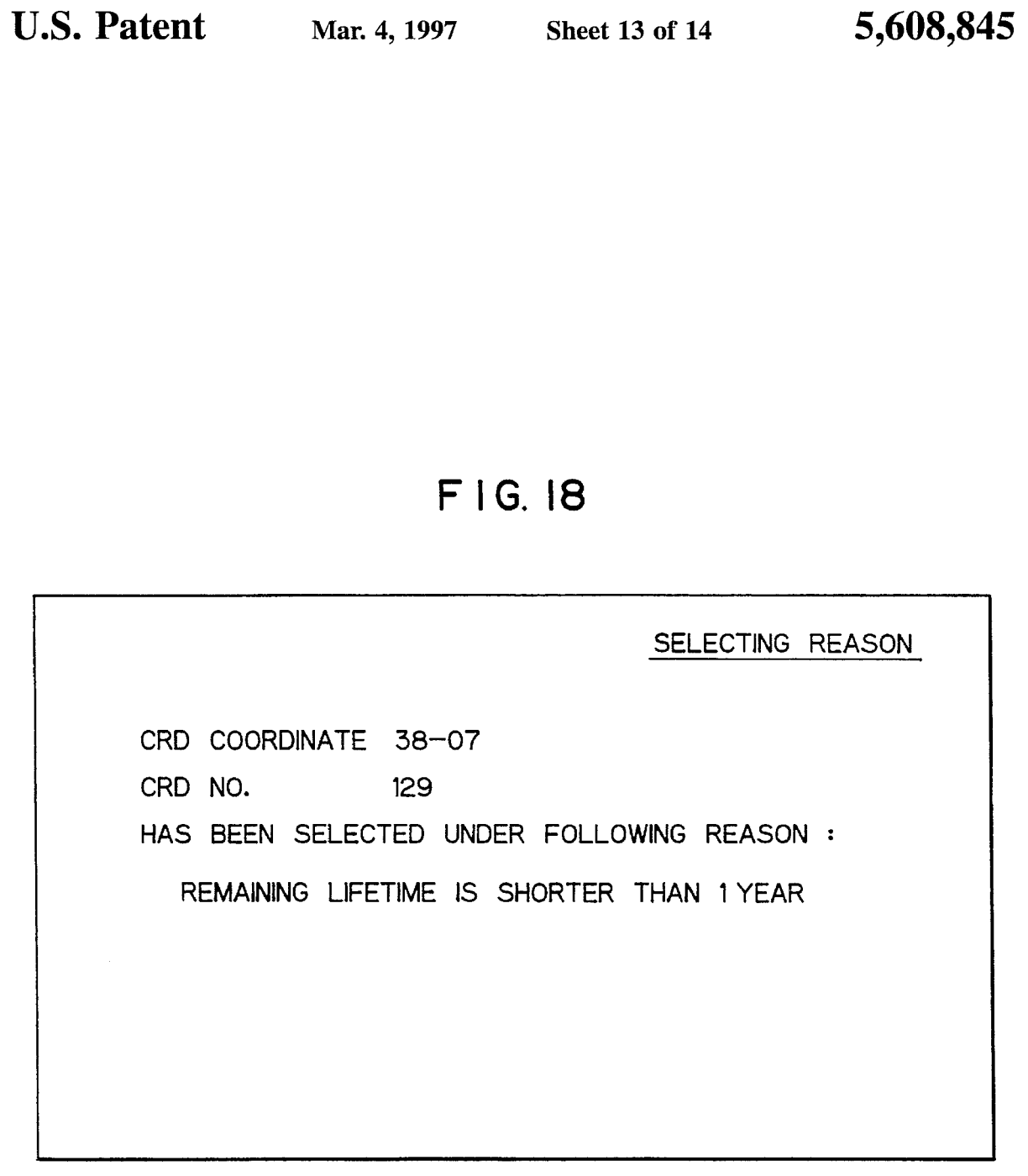

SELECTING REASON

CRD COORDINATE 38-07

CRD NO. 129

HAS BEEN SELECTED UNDER FOLLOWING REASON :

REMAINING LIFETIME IS SHORTER THAN 1 YEAR

METHOD FOR DIAGNOSING A REMAINING LIFETIME, APPARATUS FOR DIAGNOSING A REMAINING LIFETIME, METHOD FOR DISPLAYING REMAINING LIFETIME DATA, DISPLAY APPARATUS AND EXPERT SYSTEM

This is a divisional of application Ser. No. 07/494,629, filed Mar. 16, 1990, now abandoned.

BACKGROUND OF THE INVENTION

The present invention generally relates to a method and apparatus for diagnosing a remaining lifetime of an aggregate constructed of a plurality of components, or parts wherein the remaining lifetimes of the components have a relationship with an entire remaining lifetime of the aggregate. More specifically, the present invention is directed to a remaining lifetime diagnostic method and a diagnostic apparatus thereof suitable for properly diagnosing the remaining lifetime of an aggregate, to a display method and a display apparatus for displaying a diagnosed result remaining lifetime and also to an expert system for inferring what measure is required based upon the acquired remaining lifetime.

Since parts or components for constructing an apparatus such as an electric power plant receive force externally applied thereto under higher temperatures, lifetime damage and degradation of materials occur when the parts have been utilized for a long time. Then, these components are required to be substituted by new components when a certain time period has elapsed. Accordingly, to predict such an exchanging time period of the components, remaining lifetimes thereof must be diagnosed. In the conventional cases, for example as described in JP-A-62-2 76470, the set lifetime values preset by the manufacturers when the apparatuses are manufactured, and also the predicted lifetime values acquired from the accelerated lifetime test data are utilized so as to diagnose the remaining lifetimes of the apparatuses. Furthermore, the degradation characteristic of the components, or parts for constructing the apparatus is obtained from the degradation characteristic test data, and the remaining lifetime of the apparatus is predicted based upon this degradation characteristic and the limit value of the parts. Moreover, the function test of the apparatus is performed so that the remaining lifetime of the apparatus is predicted based on the function test data.

There are problems in the above-described conventional techniques such that correct remaining lifetime can be hardly predicted for any of these apparatuses. For instance, in such a conventional method that the degradation characteristic of the components is acquired from the aging degradation characteristic test data and thus the remaining lifetime is predicted based upon this aging degradation characteristic, a large quantity of aging degradation characteristic test data on the parts or components are required so as to obtain a correct degradation chracteristic formula (it is required to destroy the parts for experimental purposes). This is caused by that the proper approximate equation for the degradation characteristic equation is not obtained.

Also, in another conventional method for predicting the remaining lifetime based upon the function test data of the apparatus while performing the periodrical maintenance, there are many apparatus the functions of which are not lowered during the inspection, and therefore prediction of the remaining lifetime must be realized by utilizing the experts experiences.

There are some possibilities that an apparatus which is not required for replacement is substituted by new one unless a remaining lifetime of this apparatus can be precisely predicted. It is not true that if an apparatus is new, there exists a few failure. However, an initial failure rate is greater than another failure rate of an apparatus under operation. As a consequence,. if a new apparatus is merely used for replacement without careful consideration, it causes higher cost and a safety problem may occur.

There is another problem in the conventional remaining lifetime diagnostic technique that no specific care is taken in readily representing the diagnosed results and a trend of an overall remaining lifetime to an operator.

SUMMARY OF THE INVENTION

A primary object of the present invention is to provide a remaining lifetime diagnostic method, a diagnostic apparatus, and an expert system capable of properly diagnosing a remaining lifetime for an aggregate constructed of a plurality of components.

A secondary object of the present invention is to provide a remaining lifetime data display method and a display apparatus for clearly and simply displaying a trend in remaining lifetimes of a large quantity of components for constructing an apparatus, or an aggregate.

In accordance with one aspect of the present invention, the above-described first object thereof may be achieved by obtaining a remaining lifetime of an aggregate based upon a relationship between aging degradation characteristic test data of components and apparatus test data of the aggregate containing the components.

Also, according to another aspect of the present invention, the above-described first object thereof may be achieved by performing a Weibull's distribution reliability analysis for aging degradation characteristic test data of components so as to obtain the reliability of the components; by acquiring a remaining lifetime of an aggregate based upon the resultant reliability; further by acquiring another remaining lifetime thereof based on the aging degradation characteristic test data of the components; and by employing a shorter remaining lifetime.

In accordance with still another aspect of the present invention, the first object thereof may be achieved by approximating an aging degradation characteristic equation of components:

$$\sigma(t)=\sigma_0\exp\{-f(T)\times t^{\alpha}\} \tag{1}$$

where:

$\alpha_0$: a degradation initial value,

T: a process amount for enhancing degradation, t: time, $$f(T)\div xT^2+yT+z$$

α, x, y, z: a coefficient.

Furthermore, in accordance with an aspect of the present invention, the second object of the present invention may be achieved by displaying a constructive component as a pattern and by displaying remaining lifetimes of the respective constructive components, corresponding with the respective patterns.

Also, in accordance with a further aspect of the present invention, the above-described second object thereof may be achieved by dividing the remaining lifetimes displayed in accordance with the constructive components in different colors based on time periods of the remaining lifetimes so as to display the color-divided remaining lifetimes.

Since the remaining lifetimes are obtained from the relative relationship between the aging degradation characteristic test data on the components and the function test data on the aggregate, it is possible to correctly diagnose the remaining lifetimes.

The higher reliability can be obtained by selecting a shorter remaining lifetime from one remaining lifetime calculated from the reliability of the apparatus and the other remaining lifetime calculated from the aging degradation characteristic test data of the component.

In addition, since the approximate expression of:

$$\sigma(t)=\sigma_0\exp\{-f(T)\times t^{\alpha}\}$$

approximates with the degradation characteristic thereof irrelevant to a sort of components, the remaining lifetime calculated from this approximate expression owns the higher reliability.

In case that the remaining lifetimes to be obtained are displayed, any operators can immediately and readily grasp the trend of the remaining lifetimes of the respective constructive components since these remaining lifetimes are displayed as patterns corresponding to the constructive components, and also are divided into different colors for display purposes. As a result, the operators can take proper measures.

BRIEF DESCRIPTION OF THE DRAWINGS

FIG. 16 is a diagram for representing a display example of the remaining lifetime of CRD;

FIG. 18 is a diagram for representing a display example of selecting reasons for the selected CRD.

DESCRIPTION OF THE PREFERRED EMBODIMENTS

Referring now to drawings, a description will be made to various preferred embodiments of the present invention.

Figure 1:
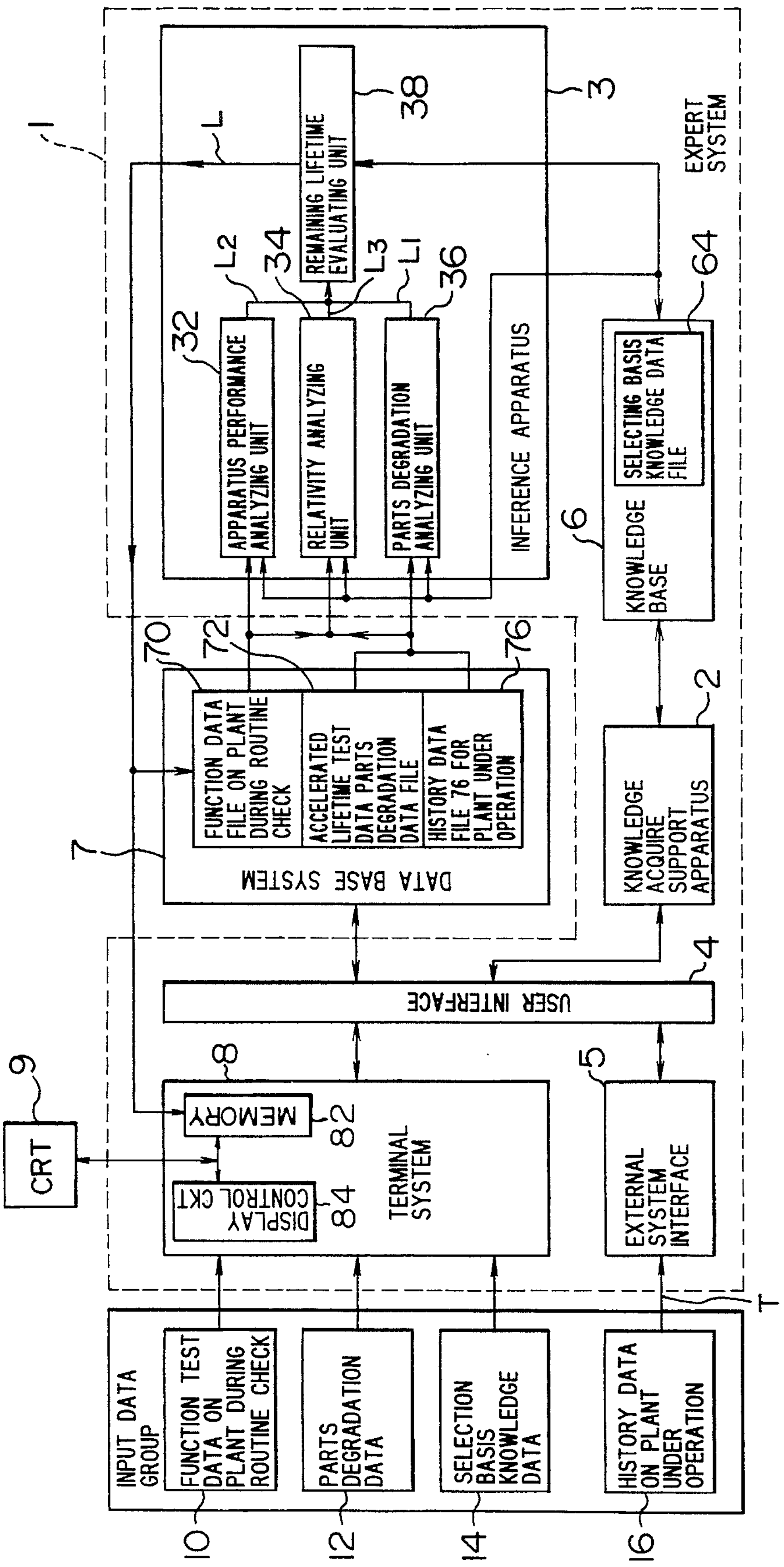
FIG. 1 is an overall arrangement of a remaining lifetime diagnostic apparatus according to a typical preferred embodiment of the present invention.

In FIG. 1, there is shown an arrangement of a typical example of an expert system according to the present invention. That is, FIG. 1 is an arrangement of an expert system for diagnosing a remaining lifetime of a parts aggregate of an electric power plant (e.g., nuclear power plant) as an example of a parts aggregate. This expert system 1 comprises knowledge acquire support apparatus 2, inference apparatus 3, a user interface 4, an external system interface 5, and a knowledge base 6. The user interface 4 is connected to a data base system 7 for managing plant data and also a terminal system 8 including an input/output apparatus such as a keyboard, a hard copying apparatus, and the like. To the terminal system 8, a display apparatus, e.g., CRT (cathode-ray tube) 9.

The below-mentioned three different data 10, 12 and 14 are input into the terminal system 8 by the keyboard (not shown) and the like. The function test data 10 corresponds to function test data of a constructive apparatus (parts aggregate) of the plant during a periodrical routine check, and is input every time the periodrical check is carried out. The data 12 corresponds to parts degradation characteristic data on parts of the constructive apparatus, acquired by an accelerated lifetime test, and also to parts degradation characteristic data which is previously and arbitrarily input.

The knowledge data 14 corresponds to knowledge data (specifications of constructive apparatus and parts, performance, limit values, accident and nonconformity information, maintenance information and so on) concerning preventive maintenance work obtained by experts and past experience, and is previously input.

Data of the plant under operation (e.g., data representative of environment of constructive apparatuses such as temperatures (T)) are supplied as history data 16 in an on-line mode from external sensors (not shown) to the external system interface 5.

The data 10 and 12 are stored via the terminal system 8 and user interface 4 into files 70 and 72 of a data base system 7, respectively, as data bases, whereas the history data 16 is stored via the external system interface 5 and user interface 4 into another-file 76 of the data base system 7. The knowledge data 14 is stored via the terminal system 8, user interface 4, and knowledge acquire support apparatus 2 into a knowledge data file 64 of the knowledge base 6 in a data form capable of being inferred.

The knowledge acquire support apparatus 2 performs operations of input/output, modify and debug of the knowledge data.

The user interface 4 easily performs to input the knowledge data obtained from experts, the maintenance, or easily responds to users.

The inference apparatus 3 performs various controls to carry out the inferences by utilizing the knowledge data which have been stored in the knowledge base 6.

The inference apparatus 3 executes a software for diagnosing the remaining lifetime of the constructive appliances in the electric power plant, features of which are as follows:

(1) As a knowledge representation, it is possible to represent a hybrid type knowledge capable of handling both a rule type knowledge represented in an if—then type production rule form, and a true type knowledge, namely a frame type knowledge in which truth and falsehood of a representation have been defined.

(2) A flexible inference method can be executed in which both a forward inference and a backward inference can be performed. A plurality of strategies for selecting a proper rule among plural instances are equipped and a free selection is made to a rule condition unit, a methodized rule and a debugger.

(3) An execution speed of an inference process is increased by converting the knowledge data which have been stored into the knowledge base into a form capable of being processed at high speed before performing the inference process, while omitting identification of a rule unnecessary for the inference. Furthermore, the number of rule groups which are used by employing the methodized rule is reduced so as to improve the high-speed process operation.

The inference apparatus 3 includes a parts degradation analysis unit 36, an apparatus performance analyzing unit 32, a relativity analyzing unit 34, and a remaining lifetime evaluating unit 38.

In case that a remaining lifetime of a constructive apparatus is diagnosed, an optimum remaining lifetime "L" is calculated by the remaining lifetime evaluating unit 38 based upon a remaining lifetime "$L_1$" obtained in the parts degradation analyzing unit 36, a remaining lifetime "$L_2$" acquired in the apparatus performance analyzing unit 32, and a remaining lifetime "$L_3$" calculated in the relativity analyzing unit 34. In the parts degradation analyzing unit 36, the degradation characteristic value of the constructive parts of the apparatus is calculated and then the remaining lifetime $L_1$ is obtained therefrom. In the apparatus performance analyzing unit 32, a calculation is made to obtain a time for which the apparatus has reached a limit value based upon the function test data of the apparatus constructed of the respective parts, and the resultant time is the remaining lifetime $L_2$. In the relativity analyzing unit 34, the remaining lifetime $L_3$ is obtained from the relative relationship between the degradation characteristic value of the constructive parts and the function test data of the apparatus. Then, in the remaining lifetime evaluating unit 38, the minimum value of these remaining lifetimes $L_1$, $L_2$, $L_3$ are equal to the optimum remaining lifetime "L".

Figure 2:
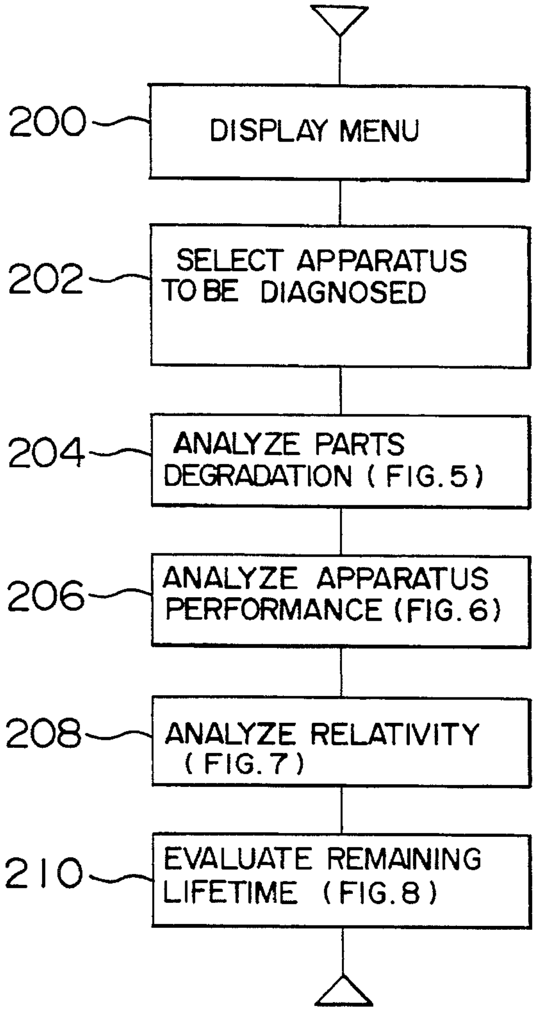
FIG. 2 is a flowchart for representing a procedure of a remaining lifetime diagnostic process according to a preferred embodiment of the present invention.

In FIG. 2, there is shown a flowchart for explaining a diagnostic process sequence for a remaining lifetime of an apparatus (i.e., parts aggregate) according to a preferred embodiment of the present invention.

Figure 3:
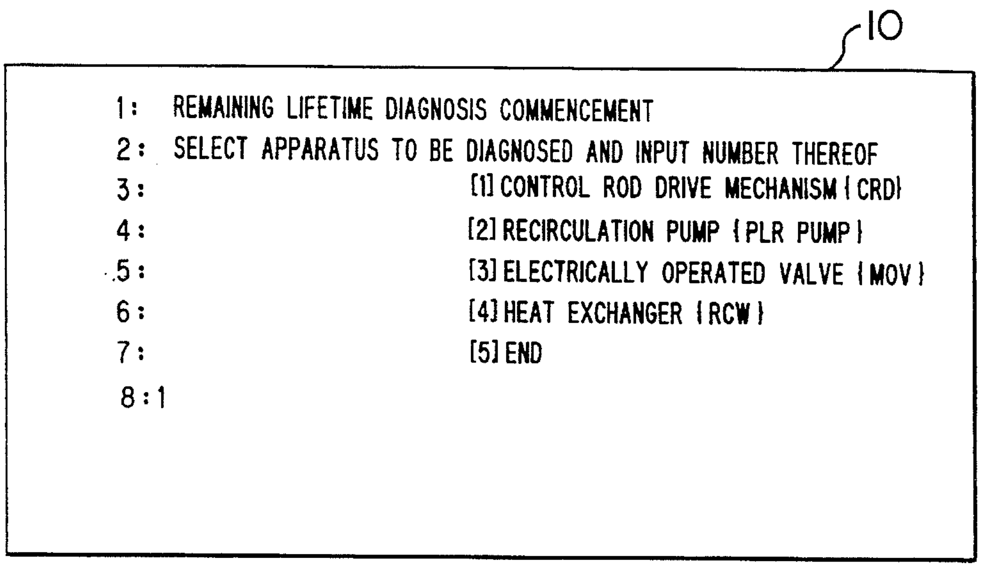
FIG. 3 is an explanatory diagram for representing one example of a menu screen of a remaining lifetime diagnostic apparatus for diagnosing a remaining lifetime of an electric power plant.

First, for instance, a menu screen represented in FIG. 3 is displayed on a display screen of CRT 9 shown in FIG. 1 (step 200).

Thereafter, an apparatus to be diagnosed, for instance, a control rod drive mechanism (CRD) displayed in the menu is designated (step 202).

Thus, with respect to CRD, a parts degradation analyzing process (step 204) is first executed, and subsequently a process for analyzing the apparatus performance (step 206), a process for analyzing a relativity (step 208), and a remaining lifetime evaluation (step 210) are sequentially performed.

It should be noted that although the remaining lifetime "L" obtained in the remaining lifetime evaluating process is output so as to be displayed in the following preferred embodiment, another remaining lifetime obtained from any of the parts degradation analysis, apparatus performance analysis, and relativity analysis may be output in order to be displayed.

Figure 4:
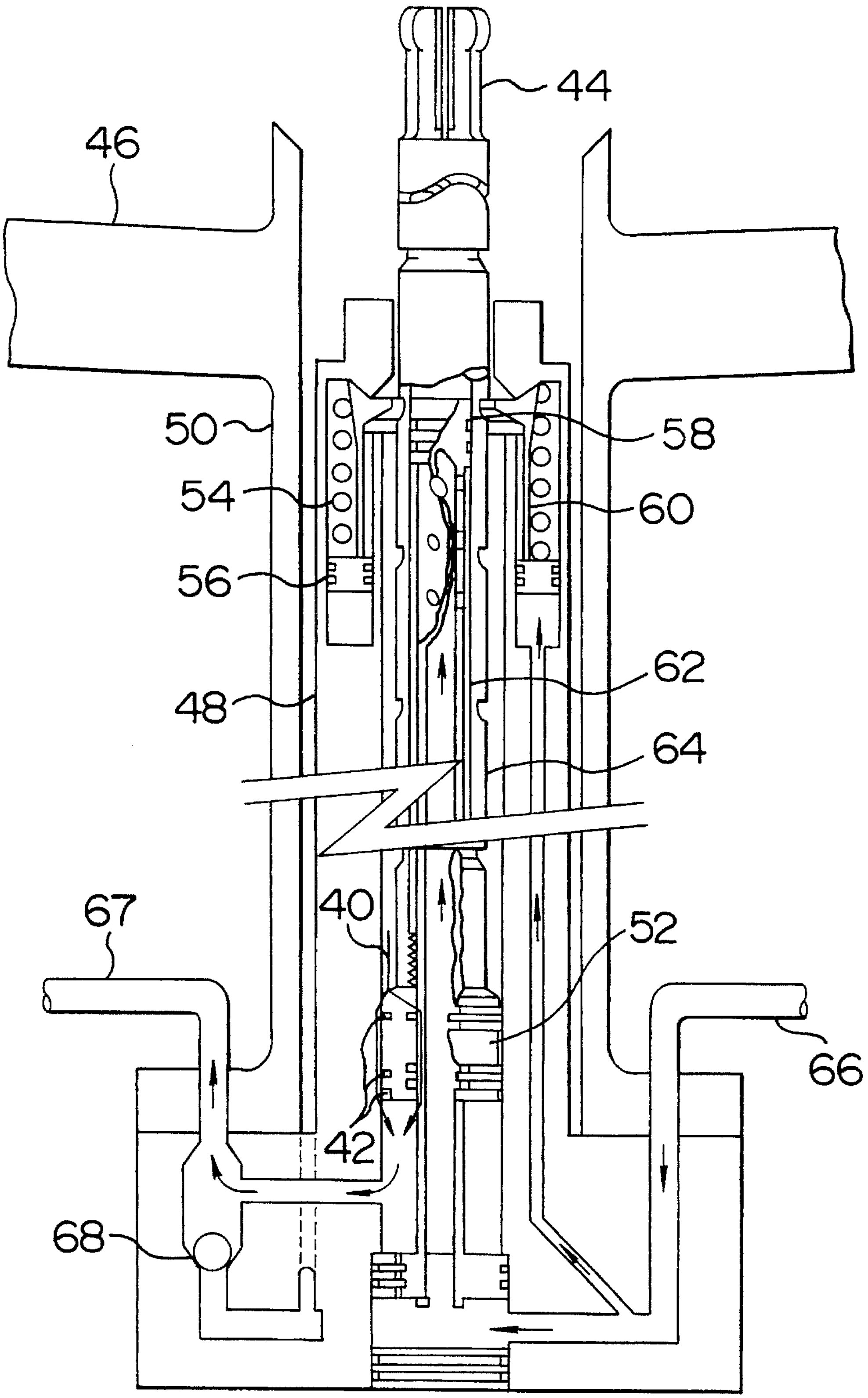
FIG. 4 is a cross-sectional view of a control rod driving mechanism (CRD)

FIG. 4 is a cross-sectional view of CRD as a constructive apparatus of a nuclear electric power plant according to an example of an apparatus to be diagnosed of the present preferred embodiment.

In FIG. 4, reference numeral 42 indicates a carbon seal; reference numeral 44 is a spud; reference numeral 46 is a reactor pressure vessel bottom; reference numeral 48 is a cylinder; reference numeral 50 is a housing; reference numeral 52 denotes a drive piston; reference nuemral 54 represents a collet spring; reference numeral 56 is a collet piston; reference numeral 58 denotes a stop piston; reference numeral 60 indicates a collet tube; reference numeral 62 represents an index tube; reference nuemral 66 is a drain pipe for drive water; reference numeral 67 indicates an insertion pipe for drive water; and, reference numeral 68 is a ball check valve. Arrows shown in FIG. 4 represent flow directions of the drive water when the control rod is pulled out.

Figure 5:
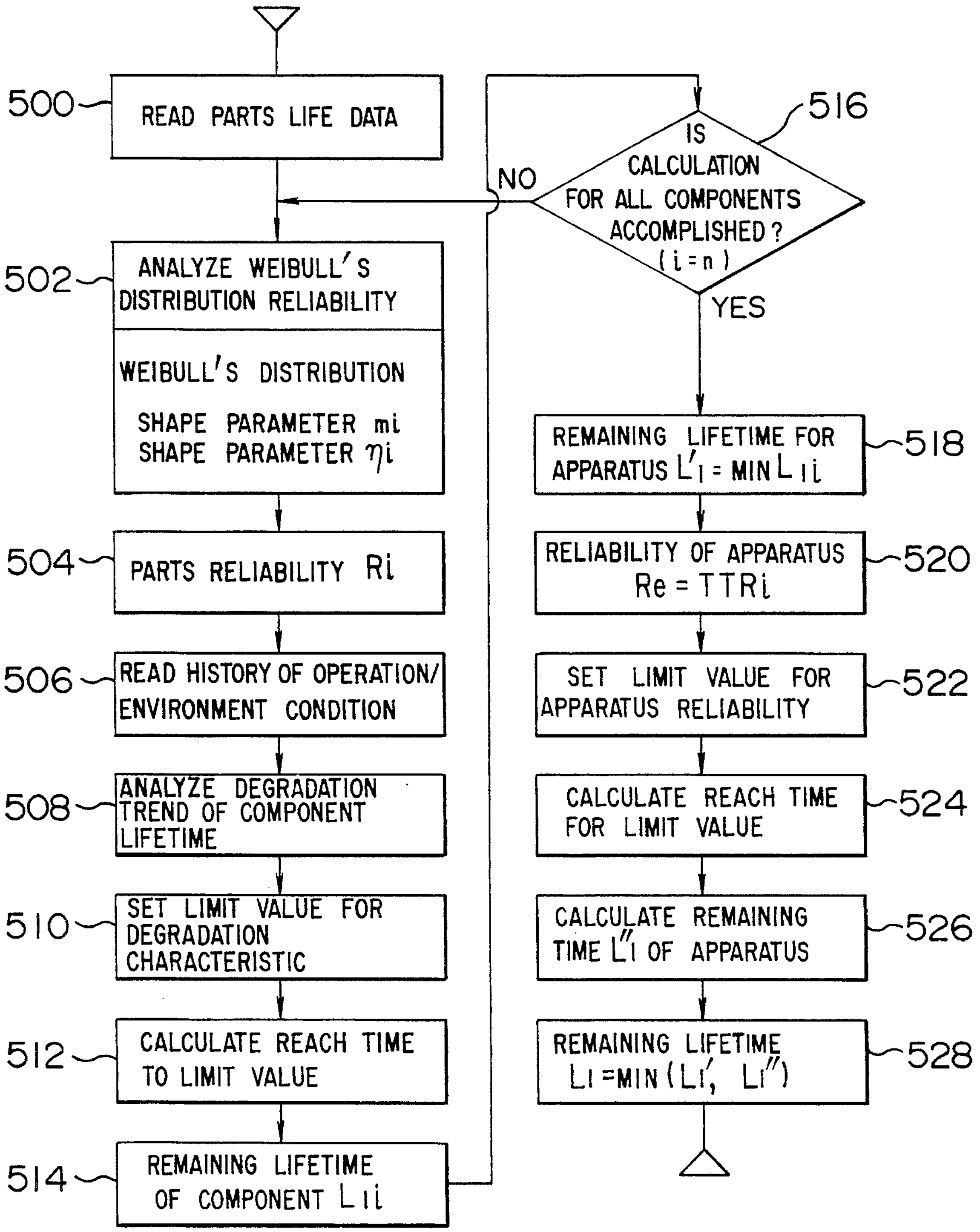
FIG. 5 is a flowchart for explaining one example of a process step of a parts degradation analyzing unit shown in FIG. 1.

First, the process sequence of the parts degradation analysis will now be described with reference to a flowchart shown in FIG. 5. In accordance with the parts degradation analyzing process of the present preferred embodiment, assuming that the remaining lifetime of CRD corresponds to $L_1$, which is calculated from the parts degradation characteristic data of the respective components for constituting CRD, for instance, accelerated lifetime test data, and another remaining lifetime of CRD corresponds to $L_2$", which is obtained from the reliabilities of the respective components based upon the failure data or parts degradation characteristic data such as the accelerated lifetime test data of the respective constructive components, a shorter remaining lifetime between them corresponds to a remaining lifetime $L_1$. It is of course possible that the first-mentioned remaining lifetime $l_1$' is equal to $L_1$, and the second-mentioned remaining lifetime $L_1$' is equal to $L_1$.

In this case, the remaining lifetime of the apparatus (CRD) can be predicted by evaluating temporal changes in degradation parameters of the respective constructive components of the apparatus under a certain operating condition, for instance, a bending strength, hardness, impact energy and the like. That is to say, it could be found out that there is a great trend in such a fact that the bending strength among these degradation parameters of the carbon seal (indicated by reference numeral 42 in FIG. 4) constituting CRD as one constructive component is lowered in accordance with an increase of an operating temperature among the operating environment conditions (for example, temperatures, pressures, number of use etc.). As a consequence, the degradation characteristic of the carbon seal may be readily evaluated and predicted by investigating the historical change characteristic with respect to the operating temperature for the bending strength.

At a first step 500, either the failure information of CRD (e.g., extraordinary increase in temperature of CRD, deformation of coupling between CRD and CR (control rod) and the like) which has been stored in the file 72 of the data base system, or the accelerated lifetime test data of the respective constructive parts (carbon seal etc.) of CRD are read. The failure information is arbitrarily supplied to the data base system 7 from the terminal system so as to be utilized while evaluating the remaining lifetime.

At a next step 502, the reliability analysis such as the Wibull's distribution analysis is performed by using the read data, e.g., accelerated lifetime test data.

It should be understood that although as this relaibility analyzing method, there are other methods for analyzing the data based upon the normal distribution logarithmic normal distribution, exponential distribution and the like, the following description will be made of the Weibull's distribution analysis in the specification.

First, data on a carbon seal as the accelerated lifetime test data is analyzed.

Figure 9:
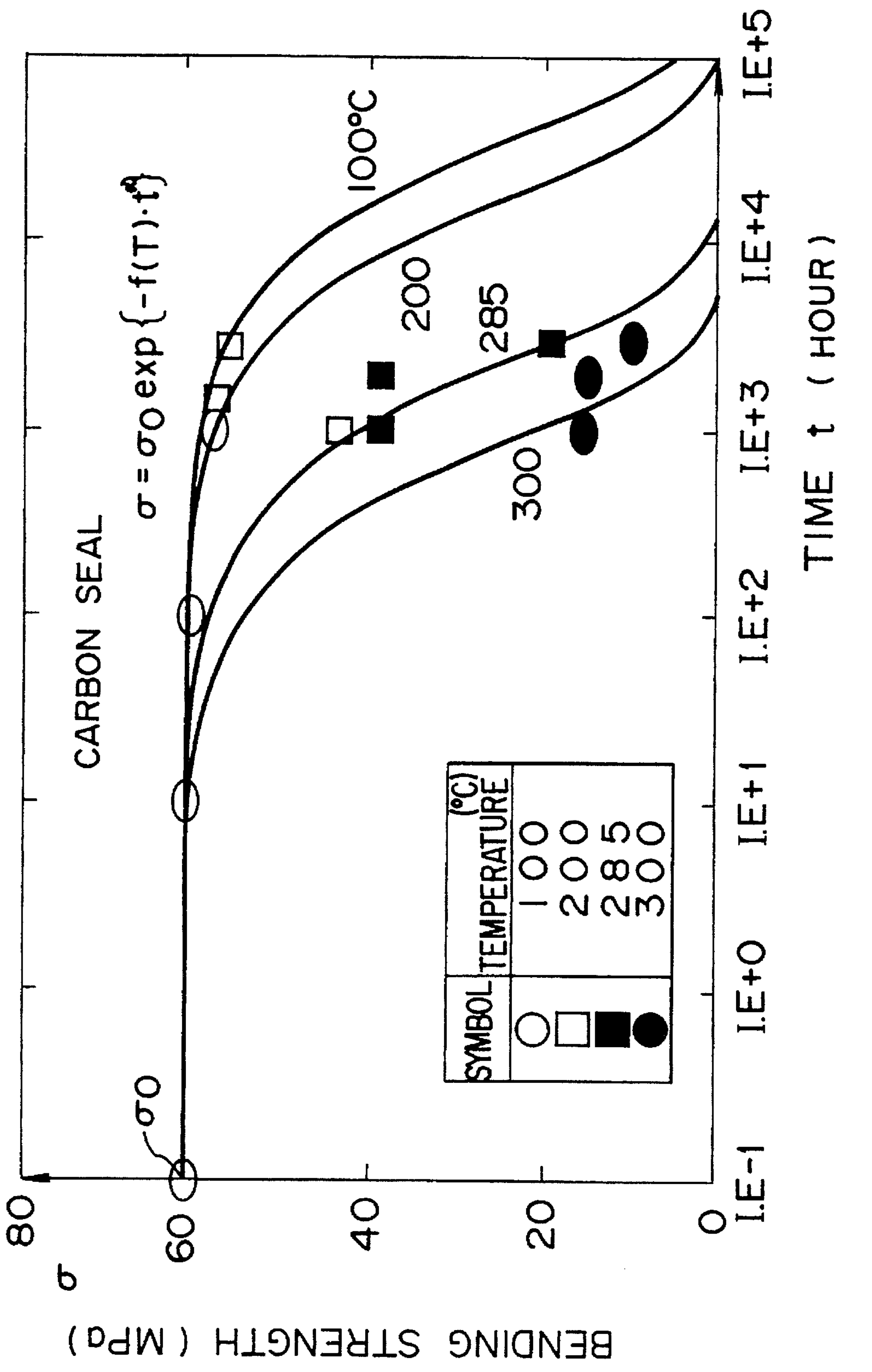
FIG. 9 is a graphic representation of a degradation characteristic of a carbon seal checked by an accelerated lifetime test.

In FIG. 9, there is shown an example of the accelerated lifetime test data of the carbon seal.

The Weibull's distribution function is expressed by the following equation:

$$f_i(t) = m_i\, t^{mi-1}/\eta_i^{mi} \exp\left\{ -\left(\frac{t}{\eta_i}\right)^{mi} \right\} \quad (1)$$

$$(t \geqq 0,\ \eta_i^{mi} > 0,\ mi > 0)$$

Both the non-reliability $F_i(t)$ and reliability $R_i(t)$ are given by the below-mentioned equations:

$$F_i(t) = 1 - \exp\left\{ -\left(\frac{t}{\eta_i}\right)^{mi} \right\} \quad (2)$$

$$R_i(t) = \exp\left\{ -\left(\frac{t}{\eta_i}\right)^{mi} \right\} \quad (3)$$

It should be noted that "mi" indicates Weibull's shape parameter representative of a failure condition of this component (parts) (if it is an initial failure, then mi<1, whereas if it is an accidental failure, then m=1, and if it is a wearing failure, then mi>1), and furthermore "ηi" denotes a scale parameter indicative of the characteristic lifetime.

Based on the accelerated lifetime test data of the carbon seal shown in FIG. 9, a shape parameter mi and a scale parameter ηi at a prediction temperature after the present time instant are obtained from the distribution function equation (1).

At the subsequent step 504, the reliability Ri of this component at the prediction temperature is obtained by way of the equation (3) based on both of the above-described parameters and the operating history time "t" of the component (carbon seal) to be diagnosed.

Figure 10:
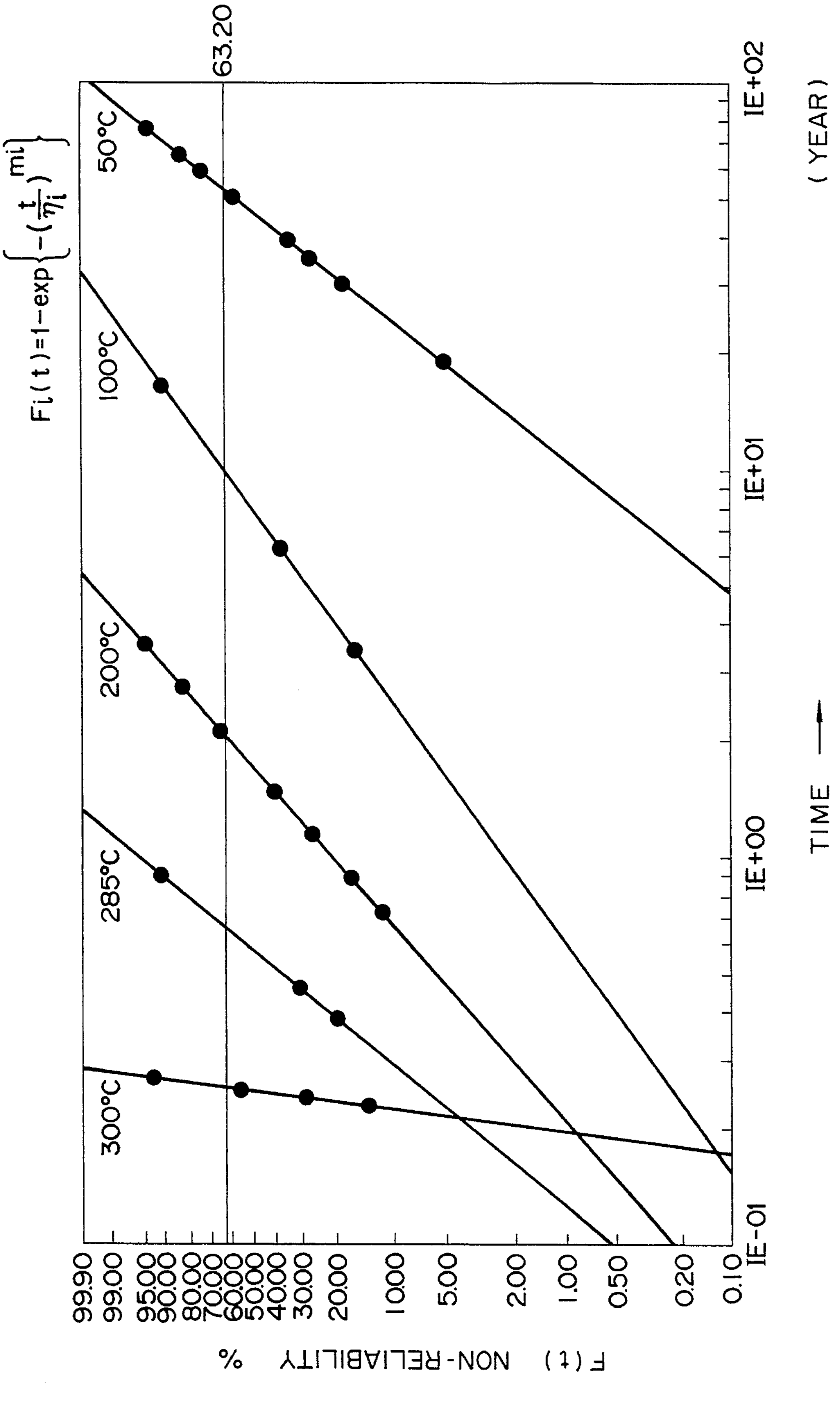
FIG. 10 is a characteristic diagram for representing non-reliability of the carbon seal obtained from the degradation characteristic shown in FIG. 9.

FIG. 10 is a characteristic diagram of the non-reliability F(t) of the carbon seal at various temperatures (50°, 100°, 200°, 285° and 300° C.) which is obtained from the degradation characteristic diagram shown in FIG. 9. In FIG. 10, the shape parameters mi at the respective temperatures are calculated from gradients of the characteristic straight lines at the various temperatures, and the characteristic lifetime ηi is obtained at a time instant when these straight lines reach the non-relaibility 63.2%. It should be noted that "E" represented in the abscissa implies an exponential. For instance, $1E-1=10^{-1}=0.1$, $1E+0=10^{0}=1$, and $1E+1=10^{1}=10$.

At a next step 506, both the accelerated lifetime test data of the carbon seal, and also the history data on the operating environment conditions thereof (e.g., operating temperature) up to now are read out from the file 76.

At a step 508, the degradation trend of the carbon seal is analyzed based upon these data so as to obtain the degradation characteristic value of the carbon seal.

It should be noted that as apparent from FIG. 9, there is such a trend that the degradation velocity of the bending strength σ is increased in response to an increase of the operating temperature. It could be found out that the bending strength can be expressed by the exponential between the time and operating temperature as indicated by the following equation (4).

$$\sigma=\sigma_0 \exp\{-f(T)\times t^{\alpha}\} \quad (4)$$

$$f(T)=aT^n+bT^{n-1} \cdots +xT^2+yT+z\div xT^2+yT+z \quad (5)$$

where $\sigma_0$ indicates an initial value (experiment value) of the degradation characteristic value; T represents a process amount for enhancing degradation, i.e., an operating temperature in the preferred embodiment; α, a, b, ···, x, y and z are experimental constants; and f(T) denotes an approximate expression of lifetime data. In general, α is equal to 1. As a consequence, the constants x, y and z are determined by way of, for instance, the method of least square based upon the history data of the temperature and the accelerated lifetime test data.

Accordingly, if the prediction pattern of the operating temperature T is obtained from the equations (4) and (5), the prediction degradation characteristic value σ(t) may be calculated as a function of time "t".

It should be noted that the above-described equations (4) and (5) are not limited to be applied to a carbon seal, but may be applied to other parts, and for instance, an amount of torsional wearing σ(t) may be obtained as the number of use "T" and the function of time "t". It should be also noted that experiment constants represent different values from the above values.

Figure 11:
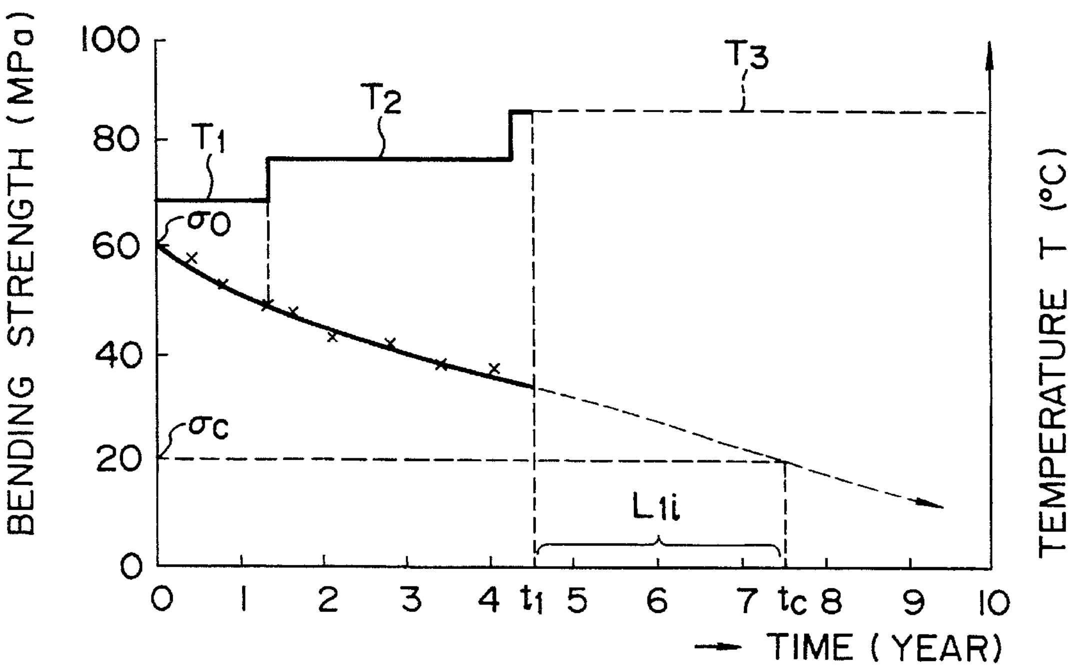
FIG. 11 is a prediction diagram of the degradation characteristic of the carbon seal.

In FIG. 11, a curve indicated by a solid line represents degradation characteristic data of a carbon seal calculated by time history temperatures $T_1$ and $T_2$ based upon the above-described equations (4) and (5) up to the present time instant "$t_1$". An initial value $\sigma_0$ of bending strength has been previously stored into the file 72, whereas a limit value $\sigma_c$ has been previously stored into the file 64 as the knowledge data.

A process amount T at the present time instant $t_1$, namely temperature is equal to $T_3$(°C.). Assuming now that the temperature at the present time instant is continued, the prediction pattern of the degradation characteristic value is obtained as indicated by a dot line.

In general, the process amount, i.e., the predicted time history pattern of the ambient temperature is selected from the following three different items.

(i) Constant continuation of temperature: It is continued with the same temperature as that of the present time instant.

(ii) Constant continuation of weighted mean temperature: The weighted mean temperature measured up to the present time instant is continued.

(iii) Temperature change pattern: It is periodrically changed with the same pattern as the temperature change measured up to the present time instant.

As a consequence, assuming now that an operating time period during which a prediction value of a characteristic value at the present time instant reaches the limit value $\sigma_0$ corresponds to a remaining lifetime, a remaining lifetime "$L_{li}$" is calculated from the following equation (6) (steps 512 and 514):

$$L_{lj}=\log(\sigma_0/\sigma_c)/f(T)-t_1 \quad (6)$$

It should be noted that "T" corresponds to one of the selected three different prediction patterns, and the parameter of the above-described equation (5) is determined-based upon the selected prediction pattern.

The above-described process steps 502 to 514 are repeated until all of the parts for constituting CRD, i.e., n pieces of parts have been analyzed (step 516), and then the following steps will now be executed while utilizing both the reliability Ri and remaining lifetime $L_{li}$ calculated for the respective parts.

First, the shortest remaining lifetime is selected from the remaining lifetimes $L_{li}$ ($L_{ll}$ to $L_{ln}$) of the respective components so as to be defined as $L_1'$ (step 518). Since the component having the shortest remaining lifetime among the components of CRD corresponds to a carbon seal, a remaining lifetime of the carbon seal is selected as $L_1'$ at a high probability.

Subsequently, the reliability Re of the apparatus (CRD) is calculated from the reliability Ri of the respective constructive components which have been obtained at the previous step 504 by way of the following equation (7):

$$\begin{aligned} R_e &= \prod_{i=1}^{n} R_i \\ &= R_1 \cdot R_2 \cdot \ldots \cdot R_n \\ &= \exp\left\{ -\sum_{i=1}^{n} (t/\eta_i)^{mi} \right\} \end{aligned} \quad (7)$$

Thereafter, the limit value Rec of the reliability of CRD is read out from the knowledge data file 64 (step 522), and Re=Rec is applied to the above equation (7), whereby "t" is calculated by employing the sequential approximate expression such as Newton Raphson method.

Figure 12:
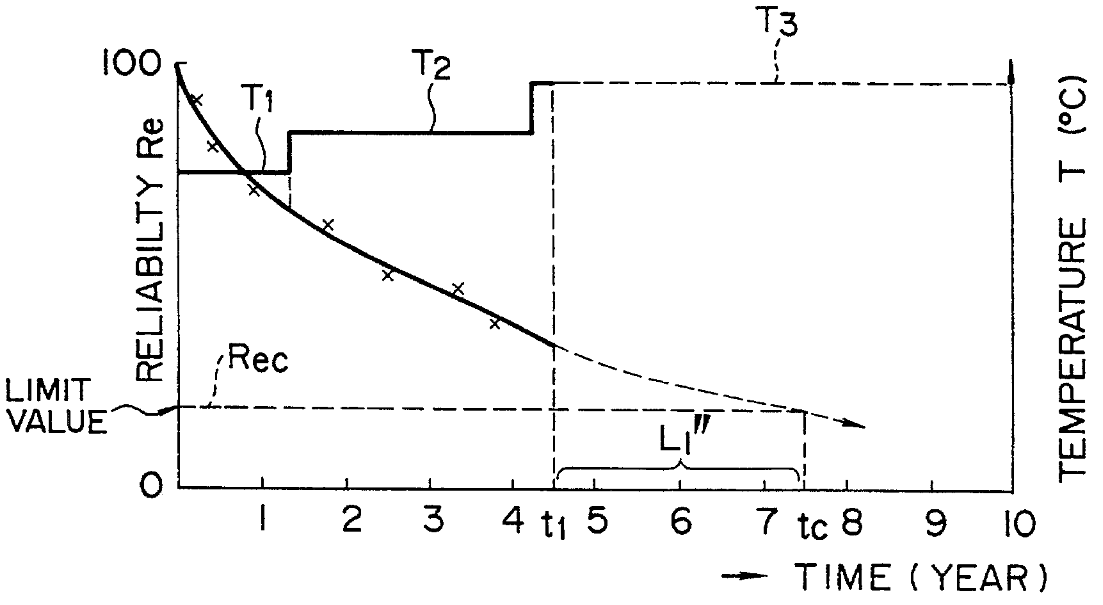
FIG. 12 is a diagram for representing a characteristic of reliability of CRD (control rod driving mechanism)

FIG. 12 represents a characteristic diagram of the reliability Re of CRD. The value of the reliability Re up to the present time instant $t_1$ is calculated from the above equations (3) and (7) in response to the predicted operating temperature T. Assuming now that the predicted operating temperature T will be maintained from the present value $T_3$, the prediction pattern of the future's reliability Re may be predicted as indicated by a dot line based upon the equations (3) and (7), and a time instant "$t_c$" at which Re=Rec may be calculated by way of the above-described sequential approximate expression. Accordingly, the remaining lifetime $L_l''$ of CRD may be obtained as $L_l''=t_c-t_l$ (step 526).

Then, finally, a comparison is made between the remaining lifetime $L_l'$ and remaining lifetime $L_l''$, and thus the shorter remaining lifetime is defined as "$L_l$" (step 528).

Figure 6:
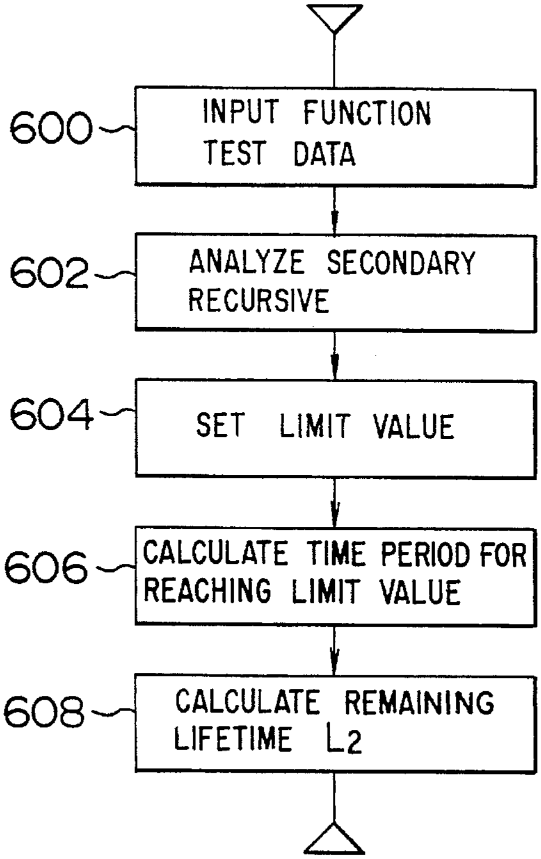
FIG. 6 is a flowchart for explaining one example of a process step of an apparatus performance analyzing unit.
Figure 13:
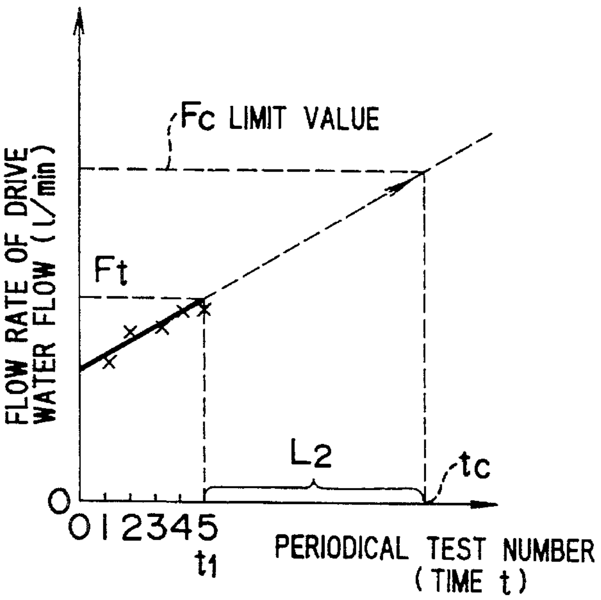
FIG. 13 is a characteristic diagram of CRD checked by a function test.

FIG. 6 is a flowchart for representing a process step of the apparatus performance analyzing unit 32. In the preferred embodiment, the remaining lifetime $L_2$ of CRD is calculated by analyzing the function test data of the apparatus (CRD). FIG. 13 is a characteristic diagram of function test data for calculating a remaining lifetime $L_2$ of CRD.

First, at a step 600, the function test data is read out from the file 70.

As the function test data, in case of, for instance, CRD, the past data on the leak amount of the drive water during the periodric check is read out.

As represented in FIG. 4, the drive water is used to push up and depress the control rod. The drive water flows in a direction indicated by an arrow while the control rod is depressed. However, leak water may flow between the carbon seal and cylinder unit, and between the piston tube 62 and seal at the piston 52, as represented in an arrow 40. When the amount of this leak water is increased, a large flow rate of the drive water is required for pushing up the control rod. Accordingly, the flow rate of the drive water may be employed as an amount for indicating degradation in a function of CRD.

Thus, a recursive analysis by the method of least mean or the like is performed for the temporal changing trend of the data on the flow rate (liter/min.) of drive water during the past routine check, as indicated by a cross arrow of FIG. 13, whereby an approxiamte expression (8) (i.e., equation represented by a dot line of FIG. 9) is obtained (step 602).

$$F=pt^2+qt+r \quad (8)$$

where p, q and r are constants defined by the experiment data.

Subsequently, a limit value $F_c$ of the flow rate of drive water F is read out from the file 64 (step 604). Based upon the approximate expression, a time instant $t_c$ where the flow rate F reaches the limit value $F_c$ is calculated, and the remaining lifetime $L_2$ is calculated from ($t_c-t_1$) (steps 606 and 608).

It should be noted that in case that there are plural sorts of function test data on this CRD, the remaining lifetime may be calculated by utilizing the respective function test data so as to select the shortest lifetime. Furthermore, the optimum remaining lifetime $L_2$ may be obtained based upon the following equation (9), taking account of the weighted lifetimes which have been calculated from the respective function test data:

$$L_2=(\Sigma\alpha j\, L_{2j})/\Sigma\alpha j \quad (9)$$

where "j" indicates an item number of the function test and "α" represents a weight coefficient.

Figure 7:
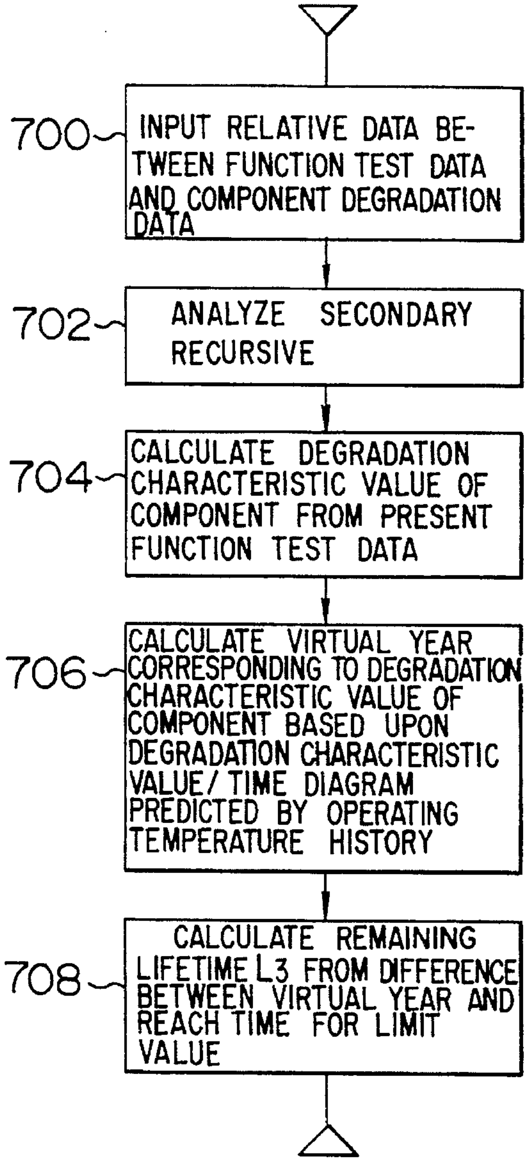
FIG. 7 is a flowchart for explaining one example of a process step of a relativity analyzing unit shown in FIG. 1.
Figure 14:
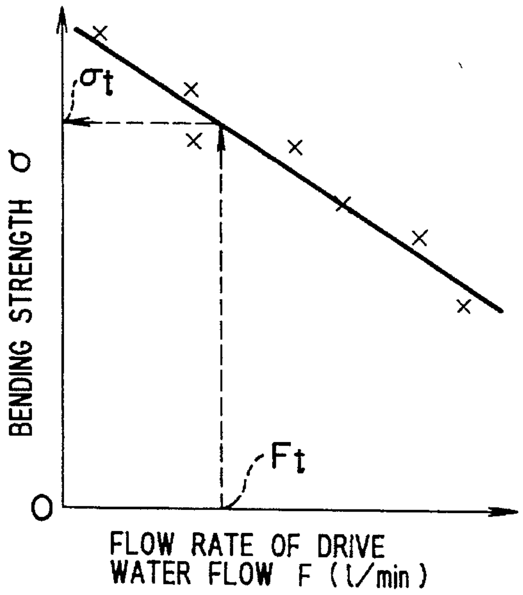
FIG. 14 is a characteristic diagram for representing a relationship between a bending strength of the carbon seal and a driving water system.
Figure 15:
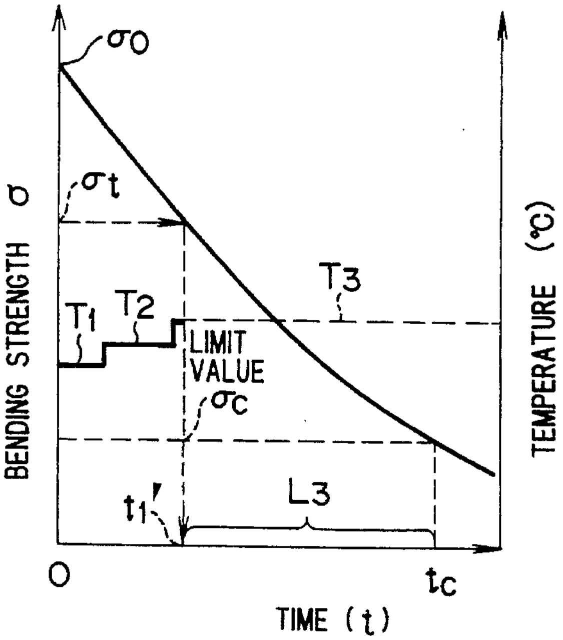
FIG. 15 is an explanatory diagram for obtaining a remaining lifetime from the bending strength of the carbon seal.

FIG. 7 is a flowchart for representing a process step of the relativity analyzing unit 34. FIGS. 14 and 15 are explanatory diagrams for the relativity analysis. That is to say, for instance, both the data on the flow rate of drive water of CRD (FIG. 13) and the data on the bending strength of carbon seal (FIG. 9) are read out from the corresponding files 70 and 72. FIG. 14 represents a relative relationship between these data.

An approximate representation equation 10 (i.e., equation indicated by a dot line of FIG. 14) is calculated by performing the method of least mean and recursive analysis for a linear recursive model and the like (step 702).

$$\sigma=-SF+S_0 \quad (10)$$

where S and $S_0$ are constants determined by the above-described data.

Subsequently, a degradation characteristic value "σt" of a component at the present time instant "$t_l$" with respect to function test data "$F_l$". is obtained from this, approxiamte expression so as to obtain $\sigma t=-SFt+S_0$ (step 704).

Then, based on both the operation history data of the operating temperature functioning as the process amount, and the accelerated lifetime test data on the bending strength of the carbon seal (FIG. 9) stored in the file 74, the prediction pattern of the degradation characteristic of the carbon seal similar to FIG. 11 is obtained similar to the curve indicated by the dot line of FIG. 15. In other words, the experiment constants x, y and z represented in the above-described equations (4) and (5) are determined.

Next, based upon the above-described equation (4), a virtual time elapse t' at the present time instant with respect to the degradation characteristic value $\sigma_t$ is obtained from the above-described parts degradation characteristic value $\sigma_t$ as $$t'=\log(\sigma_0/\sigma t)/f(T).$$

Further, a reach time for limit value $t_c$ is obtained from the prediction pattern of the degradation characteristic and the limit value $\sigma_c$ of the component as $t_c=\log(\sigma_0/\sigma_c)f(T)$, and a difference $(t_c-t')$ is calculated as the remaining lifetime $L_3$ (step 708).

It should be noted that in case that there are plural sorts of at least one of the parts degradation data and function test data, the remaining lifetimes may be obtained with respect to all of the combinations between the function test data and parts degradation data, and then a selection may be made to the shortest remaining lifetime as the remaining lifetime $L_3$. Although the virtual time elapse t' was calculated from the flow amount of drive water $F_t$, this virtual time elapse t' may be alternatively first calculated from the present bending strength $\sigma_t$ thereby to obtain the remaining lifetime $L_3$.

Based upon the above-described process results obtained from the respective analyzing units 32 to 36, evaluation and the like of the remaining lifetime may be carried out in the remaining lifetime evaluating unit 38.

Figure 8:
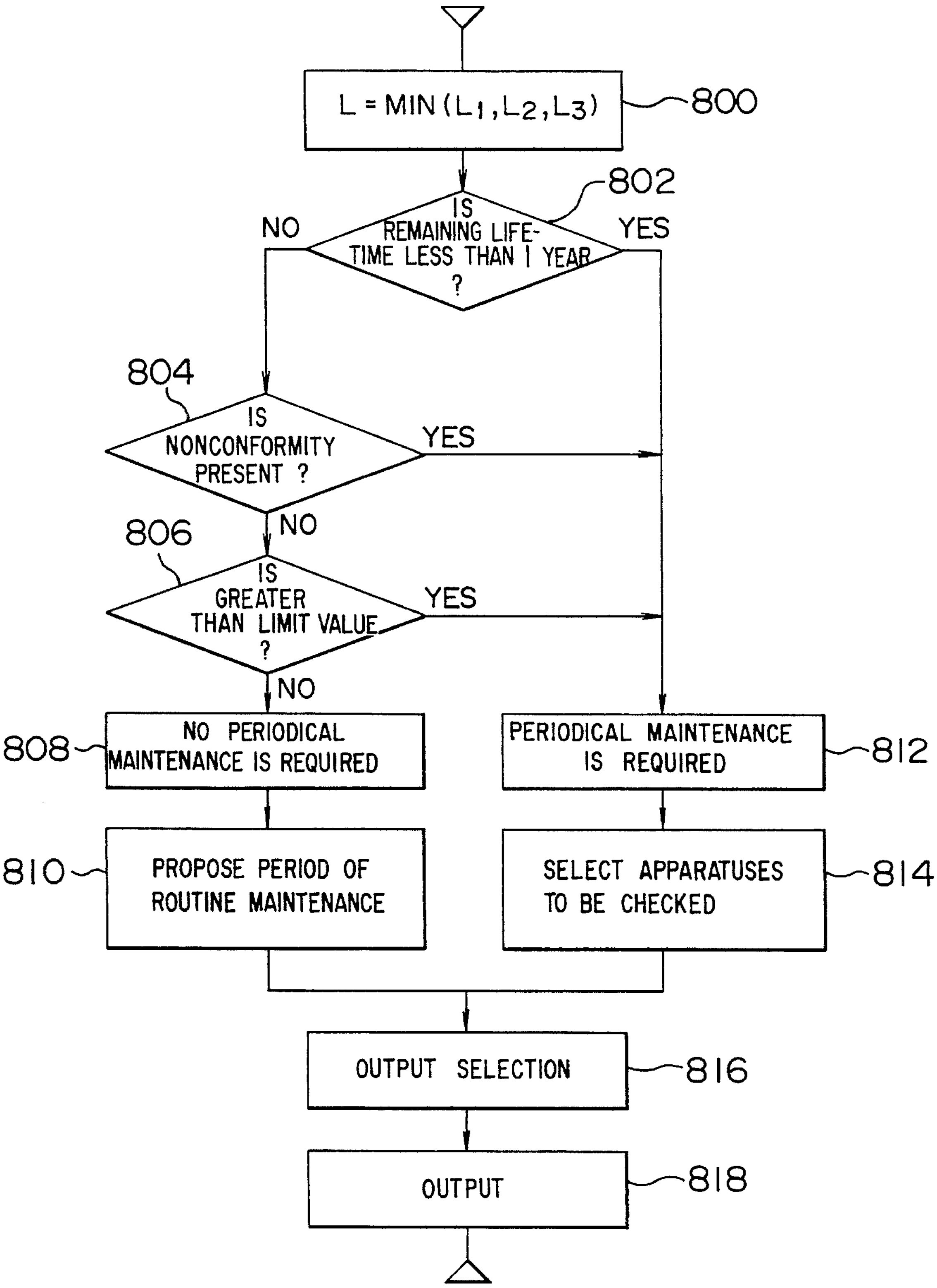
FIG. 8 is a flowchart for explaining one example of a process step of a remaining lifetime evaluating unit shown in FIG. 1.

FIG. 8 is a flowchart for representing a process step of the remaining lifetime evaluating unit. In this process step, a decision is made of a remaining lifetime "L" having the most high reliability from the remaining lifetimes $L_1$, $L_2$ and $L_3$ which have been obtained as described above, and a selection is made of an apparatus (CRD) to be checked, based upon the decision result, whereby the check result is displayed.

First, at a step 800, the shortest remaining lifetime among all of the calculated remaining lifetimes $L_1$, $L_2$ and $L_3$ is understood as the remaining lifetime L of the apparatus (CRD).

When there are a plurality of apparatuses to be diagnosed, i.e., CRDs, the above-described analysis is carried out for all of CRDs so as to obtain the remaining lifetimes L.

Then, a judgement is made whether or not the calculated remaining lifetimes "L" of the respective CRDs is shorter than a predetermined time period, for instance, shorter than 1 year (e.g., periodical checking time period) (step 802). If the checked remaining lifetime of CRD is shorter than 1 year, this CRD corresponds to the apparatus to be checked during the present periodical checking time. If the remaining lifetime of CRD is not shorter than 1 year, then another judgement is made as to whether or not a nonconformity condition appears in a time duration between the previous check and the present check (step 804). It should be noted that "the present periodical checking time" implies a next checking time if the present check corresponds to the routine check, or a latest periodical checking time if the present check corresponds to a normal check. Also, it should be noted that "the nonconformity" implies, for instance, a rapid change in an operating temperature of CRD, and a deformation of a coupling between CRD and CR, and can be detected by checking the history data stored in the file 76.

If a judgement is performed that the non-conformity appears in CRD, this CRD should be checked during the present periodical check. To the contrary, if a judgement is effected that no nonconformity appears in CRD, another judgement is made whether or not the function test data will exceed over the limit value until the next periorical check (step 806). In other words, a check is made whether or not the remaining lifetime $L_2$ of CRD which has been obtained in the function performance analysis is shorter than a time period up to the present periodical check. If yes, then this CRD corresponds to an object to be checked.

As to other CRDs, a judgement is made that no check or maintenance is required for them during the present periodical check (step 808), and a next checking time period is determined based upon the remaining lifetime thereof (step 810). For example, when the remaining lifetime is equal to 2 years, the next periodical check will be performed after 1 year from now. When the remaining lifetime is equal to 3 years, the next routine check will be executed after two years from now.

On the other hand, relating to CRDs of which a judgement is made that the check is required, a check is made of the number of these CRDs. Another check is performed whether or not the number of these CRDs exceeds over a predetermined number of the checking operation. If the number are higher than a predetermined number, for instance, CRD having a shorter remaining lifetime is first selected from a plurality of CRDs until the number of selected CRDs reaches a predetermined number.

In case that there is a small number of CRDs which have been judged such that a check is required at this time, CRDs having short remaining lifetimes are sequentially selected to be checked until the selected number reaches a preselected number at which the present check is carried out.

The above-described diagnostic results are transferred to the terminal system 8, and also the information on CRDs which have been judged such that the checks are required, are stored as check history data into the file 70 of the data base system 7.

In case that the above-described processes, in particular the remaining lifetime evaluation function is executed (e.g., steps 802 to 806, 810 etc.), the inference function is in effective. The following production rule is stored into the knowledge base 6 which has been ruled in, for instance, an if-then type:

If (a remaining lifetime of CRD is shorter than 1 year), then (this CRD is substituted by new one).

If (CRD has no nonconformity, is smaller than a limit value, and a remaining lifetime thereof exceeds over 1 year), then (a necessity of a present check for CRD is small).

If (a remaining lifetime of CRD is equal to 3 years), then (a maintenance for this CRD will be performed after two years).

If (a flow rate of drive water is greater than 13 liter/min), then (this CRD is substituted by new one).

Subsequently, at a step 816, an output selecting menue screen is displayed on CRT 20 by operating the keyboard or the like of the terminal system, whereby a selection is made of a diagnosed result output.

As this diagnosed result menu, there are, for example, "a remaining lifetime map", "a selected CRD map", "selecting reasons" and the like.

Here, the terminal system 8 includes a memory 82 for storing diagnostic results of the calculated remaining lifetimes transferred from the inference apparatus 3, and a display control circuit 84 for selectively displaying the information stored in the memory 82 on a display unit, for instance, CRT 10. The diagnostic results of CRD transferred from the inference apparatus 3 are transferred in connection with an identification code of this CRD (e.g., identification number represented in FIG. 17).

Arranged positional information on all of CRDs for the electric power plant has been previously preset in the memory 82 in accordance with the identification numbers of CRDs. A remaining lifetime, selecting information, a selecting reason and the like for the respective CRDs which have been supplied from the inference apparatus 3 are stored into this memory 82 in relation to the corresponding identification numbers of the respective CRDs.

As a result, when "a remaining lifetime map" is selected as a menu, both the arranged positional information and remaining lifetimes of all CRDs are read out from the memory 82, are displayed on CRT as patterns corresponding to the respective arranged positions of CRDs, and furthermore the remaining lifetime of each of CRDs is displayed in response to the pattern display. In this case, the remaining lifetimes may be divided into different colors based upon the periods of the remaining lifetimes for a display purposes. Also, such color information in accordance with the terms of the remaining lifetime may be previously supplied to the display control circuit 84.

Thus, when "the remaining lifetime map" is selected, both the comparison of the remaining lifetimes for the respective CRDs and the entire trend on all CRDs may be easily grasped if both the arranging positions of CRDs and remaining lifetimes thereof are displayed as preferably represented in FIG. 10. A trend of remaining lifetimes may be grasped at a glance by dividing CRD into plural different colors in response to lengths of the remaining lifetimes and by displaying them in these different colors. It should be noted that the number of both the abscissa and ordinate represented in the drawing indicates a coordinate position of CRD.

Figure 17:
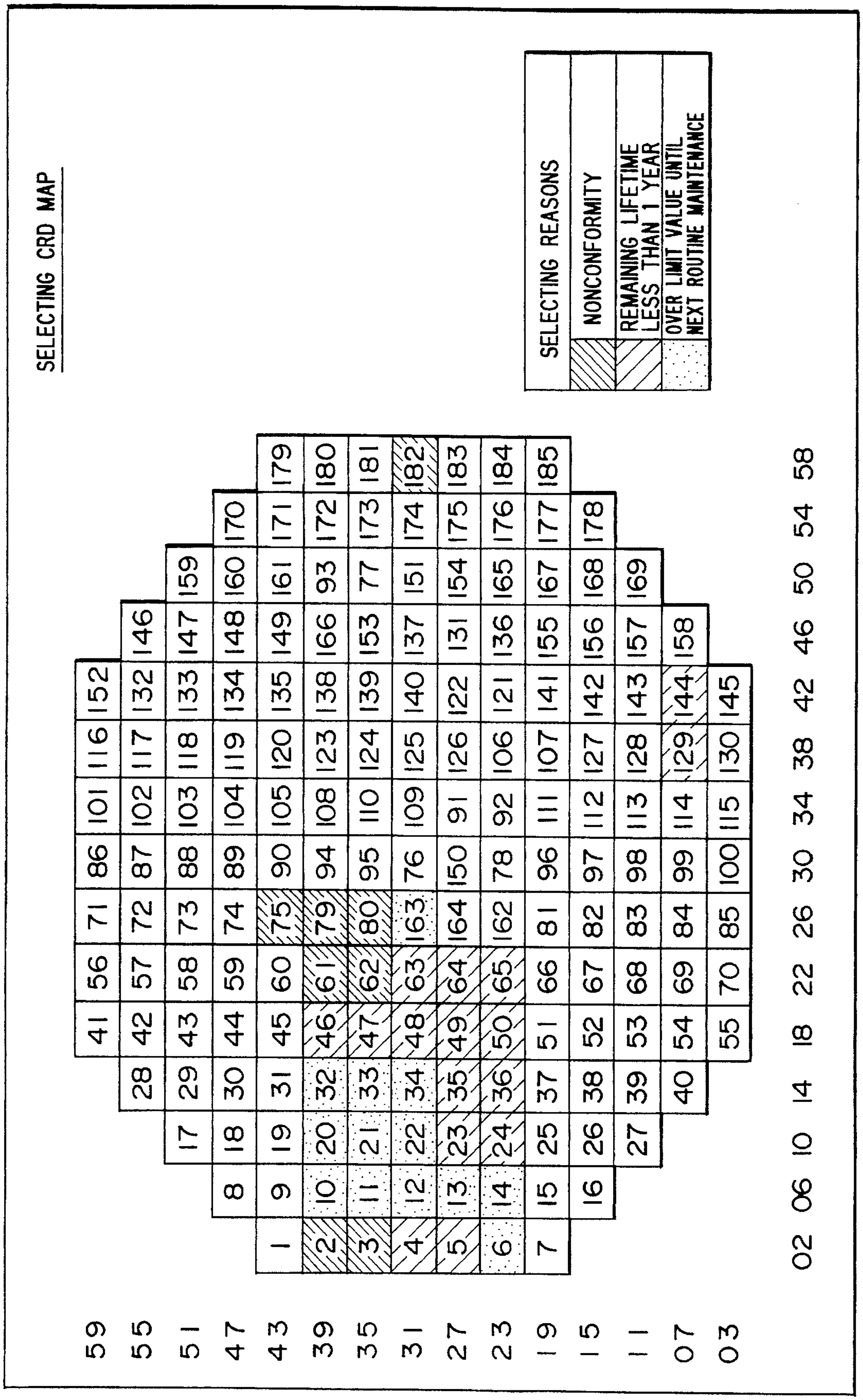
FIG. 17 is a diagram for representing a display example of CRD selected as a checking object.

When "the selected CRD map" is selected, all of CRDs are preferably displayed as in FIG. 17, and then CRD selected at the step 814 is displayed as an object to be checked in different colors. That is to say, for instance, identification numbers are sequentially allocated to CRD as represented in the drawing and the selected CRDs may be displayed in different colors in accordance with the selected reasons:

Red: CRD judged in such that there exists nonconformity.

Purple: CRD judged in such that the remaining lifetime thereof is shorter than 1 year.

Yellow: CRD the function test data of which must exceed over the limit value until the next periodical maintenance.

In the above-described remaining lifetime map and selected CRD map, CRD is designated by the keyboard or the like, the remaining lifetime for only the designated CRD, or the reason why only the designated CRD is selected may be displayed.

When "the selecting reasons" are selected and the number of the selected CRD is designated, "the selected reason" as represented in FIG. 18 is displayed.

As other displays the past operating temperatures of the respective CRDs may be read out from the file 74 so as to be displayed, the function test data may be read out from the file 70, or the parts degradation data may be read out from the file 72 in order to be displayed.

It should be noted that since information on CRD to be checked has been stored into the file 70, this information may be read out therefrom at an arbitrary time instant for the display purpose.

In the above-described preferred embodiment, the shortest remaining lifetime among the remaining lifetimes $L_1$, $L_2$ and $L_3$ was selected as the remaining lifetime L. Alternatively, the remaining lifetime $L_1'$ which has been obtained at the step 518 may be employed as this remaining lifetime L. Similarly, the remaining lifetime $L_1''$ obtained at the step 526, another remaining lifetime $L_1$ acquired at the step 528, another remaining lifetime $L_2$ obtained at the step 608, or a further remaining lifetime $L_3$ obtained at the step 708 may be utilized as the remaining lifetime L. Furthermore, the shorter remaining lifetime between $L_1'$ and $L_3$ may be used as the remaining lifetime L.

Such a selecting of the remaining lifetime analyzing method is carried out at the menu selecting step 202 shown in FIG. 2.

Similarly, in the previous step 202, as the item of the function test, one of the scram time, flow rate of drive water and so on may be selected.

A sort selection of parts employed in the parts degradation analysis (for instance, carbon seal and collet spring etc.), a selection of degradation parameters (e.g., bending strength, hardness etc.), and a designation of these limit values may be performed at the step 202.

In addition, a designation of a process amount (e.g., operating temperature etc.) for enhancing the degradation employed in the parts degradation analysis, and also another selection for a prediction pattern of a history of a designated process amount may be carried out at the step 202.

As the prediction patterns, there are, for instance, the following three sorts:

i) A constant continuation of a process amount: A process amount at a present time instant is further continued.

ii) A constant continuation of a process amount of a weighted mean: A process amount of a weighted mean up to a present time instant is continued.

iii) A pattern of a change in a process amount: A same pattern as a change in a process amount up to a present time instant is varied periodically.

Figure 19:
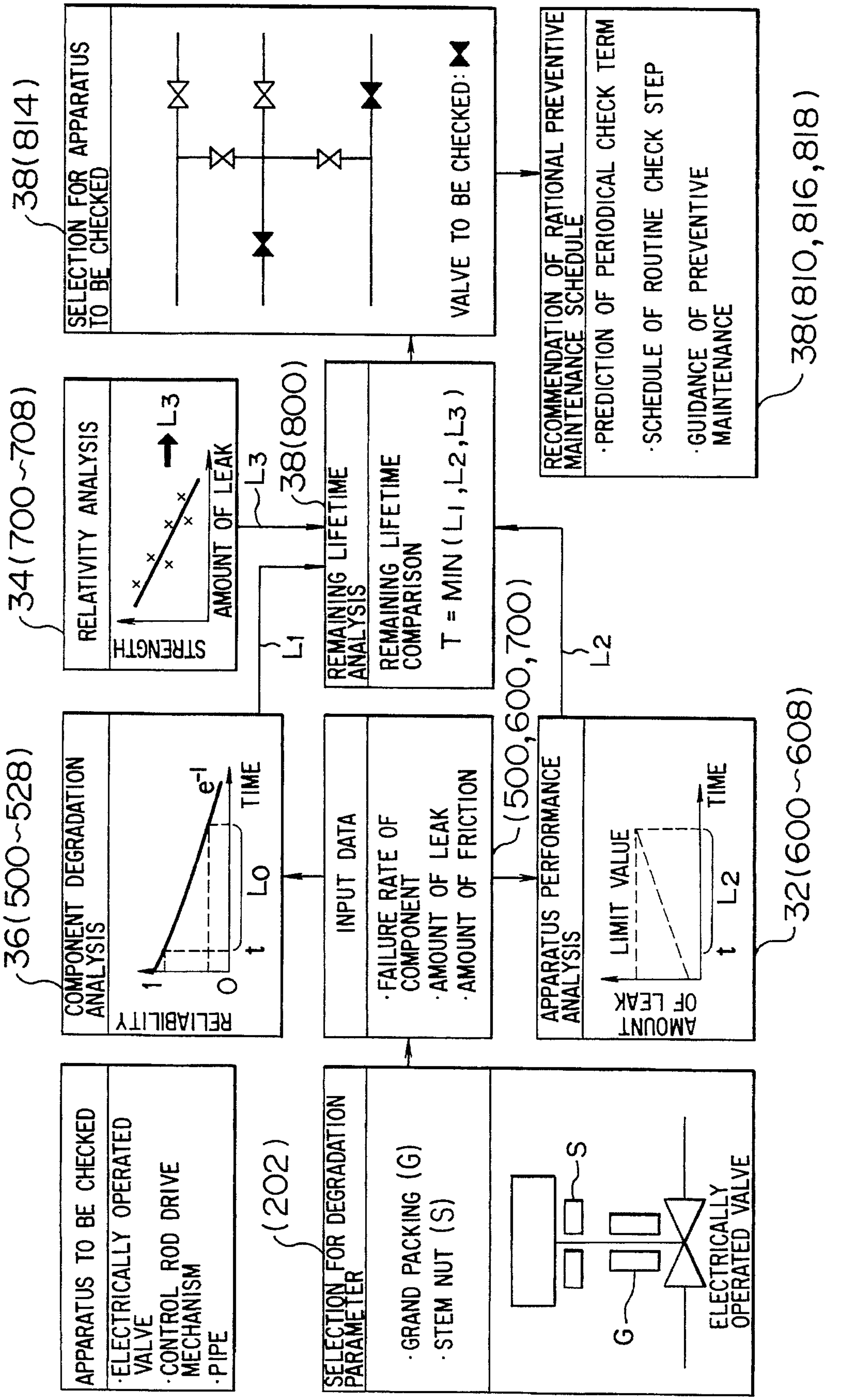
FIG. 19 is a schematic diagram in which the present invention has been applied to an electrically operated valve of an electric power plant.

It should be understood that the above-described preferred embodiments correspond to such cases that the expert system has been applied to CRD. In FIG. 19, there is shown a schematic diagram of a diagnostic process for such a case that the expert system is applied to an electrically operated valve of an electric power plant. It should be noted that reference numerals indicating the respective blocks shown in FIG. 19 correspond to the blocks shown in FIG. 1 and numerals in blanks represent the steps corresponding to FIGS. 5 to 8.

In case of an electrically operated valve, mechanical strengths of a gland packing and a stem nut correspond to the degradation characteristic values of the constructive components, and the process amounts of the degradation reasons thereof correspond to the environment temperature and fluid pressure. Also, as the apparatus performance data, there are the leak amount of the fluid and the wearing amount of the screw of the stem nut. Based upon these data, remaining lifetimes of a large quantity of electrically operated valves are predicted, the predicted remaining lifetimes are displayed, and the electrically operated valve which is checked at the present periodrical check or subsequent routine maintenance is selected for the display purpose.

In accordance with the preferred embodiments as described above, the process amount such as the operating temperature history for degrading the characteristics of the apparatus to be checked is employed so that the degradation trend of the parts can be predicted in the non-destroy method, and the remaining lifetimes of the respective CRDs and electrically operated valves can be predicted based upon the data. As a result, since the failure rates, reliability and periods of routine maintenance of these CRDs or electrically operated valves can be quickly predicted at high precision, a time required for planning the preventive maintenance scheme can be shortened. Furthermore, both the reliability and profitability of the electric power plant can be improved.

It should be noted that although the electric power plant was described in the above-mentioned preferred embodiments, the present invention is not limited thereto. It is obvious that the present invention maybe applied to all of objects to be diagnosed each of which is constructed by a plurality of components, lifetimes of which have a relationship with the entire lifetime.

We claim:

1. An expert system for determining a remaining lifetime of an aggregate constructed of a plurality of components and having at least one function and inferring information concerning said aggregate based on said remaining lifetime, comprising:

first means for receiving experimental aging degradation data on one characteristic of at least one component of said aggregate, information on at least a maintenance of said aggregate, and experimental aging data on said at least one function of said aggregate;

second means for receiving history data representing a history of operation of said aggregate;

a data base for storing said experimental aging degradation data on said one characteristic of said at least one component, said experimental aging data on said at least one function from said first receiving means and said history data representing a history of operation of said aggregate from said second receiving means;

a remaining lifetime determining apparatus for acquiring said remaining lifetime of said aggregate by reading data stored in said data base, said remaining lifetime determining apparatus comprises:

means for acquiring a first remaining lifetime of said aggregate based upon said experimental aging degradation data on said one characteristic of said at least one component of said aggregate and said history data representing a history of operation of said aggregate, means for acquiring a second remaining lifetime of said aggregate based upon said experimental aging data on said at least one function of said aggregate, means for acquiring a third remaining lifetime of said aggregate based on said experimental aging degradation data on said one characteristic of said at least one component of said aggregate and said history data relative to said experimental aging data on said at least one function of said aggregate, and means for acquiring as said remaining lifetime one of said first, second and third remaining lifetimes having the shortest lifetime and outputting said remaining lifetime of said aggregate;

a knowledge base for storing as knowledge data said information on at least a maintenance of said aggregate received from said first means for receiving relative to a value of remaining lifetime;

inferring means for performing an inference based upon the value of said acquired remaining lifetime and said knowledge data so as to obtain an inference result representing information concerning said aggregate; and means for outputting said inference result.

2. An expert system as claimed in claim 1, wherein said knowledge data includes information for indicating that a maintenance of said aggregate is required if the remaining lifetime is within a predetermined time period.

3. An expert system as claimed in claim 1, wherein said knowledge data includes information for representing that a maintenance of said aggregate is required if the experimental aging degradation data value for said at least one function is out of a predetermined range.

4. An expert system for determining a remaining lifetime of an aggregate constructed of a plurality of components and having at least one function, comprising:

first means for receiving experimental aging degradation data on one characteristic of at least one component of said aggregate, information on at least a maintenance of said aggregate, and experimental aging data on said at least one function of said aggregate;

second means for receiving history data representing a history of operation of said aggregate;

a data base for storing said experimental aging degradation data on said one characteristic of said at least one component, said experimental aging data on said at least one function from said receiving means and said history data representing a history of operation of said aggregate from said second receiving means;

a remaining lifetime determining apparatus for acquiring said remaining lifetime of said aggregate by reading data stored in said data base and outputting the acquired remaining lifetime, said remaining lifetime determining apparatus comprises:

means for acquiring a first remaining lifetime of said aggregate based upon said experimental aging degradation data on said one characteristic of said at least one component of said aggregate and said history data representing a history of operation of said aggregate, means for acquiring a second remaining lifetime of said aggregate based upon said experimental aging data on said at least one function of said aggregate, means for acquiring a third remaining lifetime of said aggregate based on said experimental aging degradation data on said one characteristic of said at least one component of said aggregate and said history data relative to said experimental aging data on said at least one function of said aggregate, and means for acquiring as said remaining lifetime one of said first, second and third remaining lifetimes having the shortest lifetime and outputting said remaining lifetime of said aggregate.

5. An expert system for diagnosing a remaining lifetime (L) of an apparatus included in a plant and selecting an apparatus to be inspected, said expert system comprising:

an external system interface for taking history data of the plant under on line operation from an external sensor;

a terminal system for taking data including knowledge data through an input/output apparatus;

a user interface connected to said external system interface and said terminal system;

a data base connected to said user interface for managing data including the history data supplied from said external system interface and said terminal system via said user interface;

a knowledge acquire support apparatus connected to said user interface for receiving the knowledge data from said terminal system via said user interface;

a knowledge base connected to said knowledge acquire support apparatus for storing the knowledge data supplied from said knowledge acquire support apparatus; and an inference apparatus connected to said knowledge base and said data base for diagnosing the remaining lifetime (L) of an apparatus of the plant based on said data including the history data and the knowledge data respectively stored in said data base and said knowledge base;

wherein said terminal system takes two kinds of data including:

function test data which is acquired in a function test of a constructive apparatus of the plant during a periodical check and is stored in said data base every time the periodical check is carried out, and parts degradation characteristic data which is acquired in an accelerated lifetime test of parts of the constructive apparatus or materials of the plant and is stored in said data base, wherein knowledge data is obtained from specification of the constructive apparatus and parts, performance, and maintenance information, or from past experience of experts concerning preventive maintenance work.

6. An expert system according to claim 5 wherein an output section of said terminal system has a function for displaying a result of diagnosis including the remaining lifetime (L) obtained by said inference apparatus, for each part of the constructive apparatus or for each apparatus to be inspected together with a disposition thereof.

7. An expert system according to claim 6 wherein said diagnosis result is numerical data of the remaining lifetime (L).

8. An expert system according to claim 6 wherein said diagnosis result is color data displayed by different colors depending on a difference in length of the remaining lifetime.

9. An expert system according to claim 5 wherein an output section of said terminal system has a function to clearly indicate the apparatus to be inspected which is selected by said inference apparatus.

10. An expert system according to claim 5 wherein an output section of said terminal system has a function for displaying a sentence stating a reason why the apparatus to be inspected is selected.

11. An expert system for diagnosing a remaining lifetime (L) of an apparatus included in a plant and selecting an apparatus to be inspected, said expert system comprising:

an external system interface for taking history data of the plant under on line operation from an external sensor;

a terminal system for taking data including knowledge data through an input/output apparatus;

a user interface connected to said external system interface and said terminal system;

a data base connected to said user interface for managing data including the history data supplied from said external system interface and said terminal system via said user interface;

a knowledge acquire support apparatus connected to said user interface for receiving the knowledge data from said terminal system via said user interface;

a knowledge base connected to said knowledge acquire support apparatus for storing the knowledge data supplied from said knowledge acquire support apparatus; and an inference apparatus connected to said knowledge base and said data base for diagnosing the remaining lifetime (L) of an apparatus of the plant based on said data including the history data and the knowledge data respectively stored in said data base and said knowledge base;

wherein said terminal system takes two kinds of data including:

function test data which is acquired in a function test of a constructive apparatus of the plant during a periodical check and is stored in said data base every time the periodical check is carried out, and parts degradation characteristic data which is acquired in an accelerated lifetime test of parts of the constructive apparatus or materials of the plant and is stored in said data base, wherein knowledge data is obtained from specification of the constructive apparatus and parts, performance, and maintenance information, or from past experience of experts concerning preventive maintenance work, wherein said inference apparatus comprises:

a parts degradation analyzing unit for calculating a first remaining lifetime ($L_1$) of parts by using the parts degradation characteristic data or parts failure data;

an apparatus performance analyzing unit for calculating a second remaining lifetime ($L_2$) of the parts by using the function test data, a relativity analyzing unit for calculating a third remaining lifetime ($L_3$) of the parts from a relative relation between the parts degradation characteristic data and the function test data, and a remaining lifetime evaluating unit for calculating the remaining lifetime (L) from said first, second and third remaining lifetimes ($L_1$, $L_2$, $L_3$) and for selecting the apparatus to be inspected.

* * * * *